United States Patent Office 3,700,625
Patented Oct. 24, 1972

3,700,625
FLAME-RETARDED OLEFIN POLYMERS AND
ADDITIVE SYSTEMS THEREFOR
Donnie G. Brady, Ernest A. Zuech, and Roy A. Gray,
Bartlesville, Okla., assignors to Phillips Petroleum
Company
No Drawing. Filed Aug. 30, 1971, Ser. No. 176,259
Int. Cl. C08f 45/58
U.S. Cl. 260—45.75 R    5 Claims

ABSTRACT OF THE DISCLOSURE

Flame-retarded olefin polymers are provided by admixing with the polymer a flame-retardant additive system which consists essentially of (A) a compound of the formula

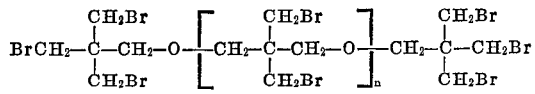

wherein $n$ is 0 to 5 and (B) antimony trioxide.

It is known that bromine-containing compounds are generally effective flame-retardant additives for polyolefins, particularly for polypropylene. However, most compounds of this type have limitations due to their thermal instability which restricts the maximum processing temperature which can be employed. In addition, it has been found that many such bromine compounds, while providing a flame-retardancy effect, are unsuitable because of their tendency to cause degradation of the polymer. This adverse effect can be readily observed by the increase in the melt flow number of the polymer composition. Thus, an additive system capable of providing a flame-retardancy effect to the polymer while at the same time avoiding an adverse effect on the melt flow number of the polymer composition, and which would be processable at elevated temperatures, would be a significant contribution to the art.

Accordingly, it is an object of this invention to provide a novel flame-retardant additive system for polyolefins.

It is a further object of this invention to provide a novel flame-retarded composition of polyolefins.

Other aspects, objects and advantages of the invention will be readily apparent to those skilled in the art from a reading of the following disclosure.

In accordance with the present invention, we have discovered that flame-retarded compositions of olefin polymers having a minimal alteration of their melt flow number are obtained by admixing with the olefin polymer an additive system which consists essentially of (A) a compound of the formula

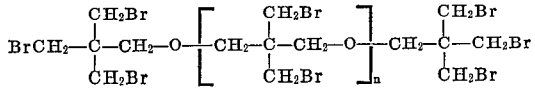

wherein $n$ is 0 to 5 and (B) antimony trioxide.

More particularly, we have now discovered that utilization of the additive system consisting of the combination of the brominated compounds (A) as above described and (B) antimony trioxide as a flame retardant for olefin polymers, particularly for polypropylene, results in a polymeric composition which is not only flame-retarded but is not subject to polymer deterioration under conditions of fabrication. The degree of polymer deterioration or degradation can be readily determined by measuring the increase effected on the melt flow number (MFN) (ASTM D 1238–65T, Test Condition L) of the final polymer composition containing the additive system when elevated to the temperature range generally employed in fabrication processes. In addition, the additive system of this invention has the further advantage that its use in the polymer composition does not cause an adverse effect on the color thereof.

In one presently preferred embodiment of the present invention, the additive system to be employed with the polymer is hexabromodipentaerythritol when $n$ is 0 in formula (A) above and the polymer is preferably a normally solid polymer of propylene.

The brominated compounds (A) as employed in the additive system are known chemical compounds which can be readily prepared from the corresponding hydroxy compounds by reaction with phosphorus tribromide. Other brominating agents that can be used as alternates to $PBr_3$ are thionyl bromide, mixtures of bromine with red phosphorus, hydrogen bromide in glacial acetic acid, and aqueous hydrobromic acid employed in such amounts and at sufficiently low temperatures to avoid cleavage of the ether bonds.

Examples of compounds of formula (A) in addition to hexabromodipentaerythritol (HBDP) are:

| $n$: | Compounds |
|---|---|
| 1 | Octabromotripentaerythritol. |
| 2 | Decabromotetrapentaerythritol. |
| 3 | Dodecabromopentapentaerythritol. |
| 4 | Tetradecabromohexapentaerythritol. |
| 5 | Hexadecabromoheptapentaerythritol. |

The additive system of this invention is prepared by mixing at least one compound of formula (A) and antimony trioxide in amounts such that the weight ratio of A:B is in the range of 1:1 to 5:1.

In utilizing the additive system herein, there is no definite upper limit for the amount of total additives to be employed, so long as the properties of the polymeric composition required for a particular use are retained. Ordinarily, the additives are used at the lowest level which will provide the desired degree of retardancy. The following ranges are generally employed:

| | Broad [1] | Preferred [1] |
|---|---|---|
| Bromo(polypentaerythritol) | 1–15 | 2–5 |
| Antimony trioxide | 1–15 | 1–2.5 |

[1] Parts per hundred parts of polymer.

The upper limit of total additive incorporated into any normally solid olefin polymer will vary with each host material. However, for one presently preferred embodiment of this invention, the preferred ranges listed above are those which have been found to be most applicable to polypropylene.

The production of the flame-retarded compositions can be carried out in various manners, readily apparent to those skilled in the art. For example, intimate mixture of the polymer and flame-retarding additive according to this invention can be achieved by mixing the various additives with the polymer at an elevated temperature in an extrusion press or kneader. Since the incorporation of flame retardants in general with polymers is a technique well known in the art, the mode of mixing the ingredients constituting the novel compositions of this invention is not considered a part of this disclosure.

The flame-retarded compositions of this invention are useful for a variety of purposes such as in the production of electrical insulating compositions for house wiring, small appliances, electronic equipment wire insulation, jacketing and the like. In addition, the compositions formed of polypropylene are further particularly useful in fiber production wherein a significant alteration of the melt flow values of the polymer and/or the color thereof are sought to be avoided.

It is to be understood that the compositions of this invention can contain, in addition to the flame-retardant system, other additives such as certain fillers, dyes, pigments, plasticizers, antioxidants, antistatic agents and the like. Such compounds are well known in the art and, for the sake of brevity, will not be repeated here.

The polyolefins which can be made flame-retardant according to this invention are polymers of mono-alpha-olefins having the general formula $CH_2=CHR$ wherein R represents hydrogen or an aryl radical or an alkyl radical or combinations thereof such as alkaryl and aralkyl having up to a total of 10 carbon atoms in each R group. Typical polymers are the homopolymers and copolymers of ethylene, propylene, butene-1, isobutylene, pentene-1, 4-methylpentene-1, styrene, and dimethylstyrene.

The following examples will further illustrate the invention, although they are not to be construed as limiting the scope thereof.

EXAMPLE I

A series of 30 g. lots of commercially available white polypropylene containing 0.3 weight percent tetrakis methylene(3,5 - di-tert-butyl-4-hydroxy hydrocinnamate)-methane and from 0.01 to 0.02 weight percent of antioxidants and stabilizers and having a melt flow value of about 4.0 g./10 min. (ASTM D 1238–62T, Condition L) were dry blended on a two-roll mill at 320–360° F. with the flame-retardant additive system as shown in Table I below. The resulting blends were then compression molded at 325–375° F. into sheets ⅛-inch thick from which samples were cut. The burning characteristics of the samples were determined by the method of ASTM D 635–63 and the Limiting Oxygen Index method (C. P. Fenimore and F. J. Martin, Modern Plastics 43, 141, November 1966). The Limiting Oxygen Index (L.O.I.) is the minimum volume fraction of oxygen required in an oxygen/nitrogen atmosphere to sustain burning of a plastic test sample. The following results were obtained.

The above data show that HBDP imparts reduced flammability to olefin polymers. In addition, when taken in combination with the data of Example I, the system is shown to be particularly effective in its achievement of thermal stability in addition to flammability reduction of olefin polymers.

Reasonable variation and modification are possible within the foregoing disclosure without departing from the spirit or scope thereof.

We claim:
1. A flame-retardant additive system which consists essentially of (A) a compound of the formula

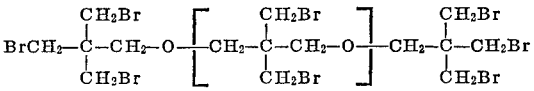

wherein $n$ is 0 to 5 and (B) antimony trioxide.

2. An additive system according to claim 1 wherein said compounds (A) is hexabromodipentaerythritol.

3. A flame-retarded composition comprising a normally solid polymer of one or more mono-alpha-olefins containing from 2 to 12 carbon atoms having admixed therein a flame-retardant additive system consisting essentially of (A) from 1 to 15 php. of a compound of the formula

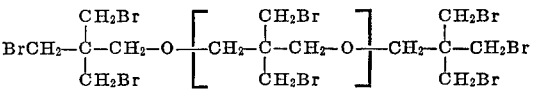

wherein $n$ is 0 to 5 and (B) from 1 to 15 php. of antimony trioxide.

4. A flame-retarded composition according to claim 3 wherein said olefin polymer is polypropylene and said compound (A) is hexabromodipentaerythritol.

5. A flame-retarded composition according to claim 4 wherein compound (A) is present in an amount of from 2 to 5 php. and compound (B) is present in an amount of from 1 to 2.5 php.

TABLE I

| Run No. | Retardant formulation | Thermal stability Color 450° F. | 470° F. | 490° F. | MFN 450° F. | 470° F. | 490° F. |
|---|---|---|---|---|---|---|---|
| 1 | 2 php. HBDP,[a] 1 php. Sb₂O₃ | White | White | White | 5.1 | 5.8 | 7.5 |
| 2 | None (control) | Colorless (translucent) | Colorless (translucent) | Colorless (translucent) | 3.6–4.4 | 3.6–4.4 | 3.6–4.4 |

[a] Hexabromodipentaerythritol.

The above data clearly demonstrate that the additive system of this invention produces a thermally stable polymer having good color properties at ordinary processing temperatures.

EXAMPLE II

A further series of olefin compositions were prepared, using commercially available polypropylene, in accordance with the process described in Example I. The flame-retardant system consisted of a combination of hexa-bromo-dipentaerythritol and antimony trioxide. The resulting samples were tested to determine the effect of the additive system on the flammability of the composition, using the Limiting Oxygen Index procedure described in Example I. The following results were obtained.

TABLE II

| Run No. | HBDP, php. | Sb₂O₃, php. | L.O.I. |
|---|---|---|---|
| 3 | 2 | 1 | .236 |
| 4 | 0 | 0 | .181 |

References Cited

UNITED STATES PATENTS

| 3,337,495 | 8/1967 | Corbett et al. | 260—45.95 |
| 2,600,455 | 6/1952 | Wilson et al. | 260—33.2 |
| 2,962,464 | 11/1960 | Felid | 260—45.95 |
| 3,642,868 | 2/1972 | Dexter et al. | 260—45.85 |

DONALD E. CZAJA, Primary Examiner

V. P. HOKE, Assistant Examiner

U.S. Cl. X.R.

252—8.1; 260—41 A, 45.7 R

UNITED STATES PATENT OFFICE

CERTIFICATE OF CORRECTION

Patent No. 3,700,625        Dated: October 24, 1972

It is certified that error appears in the above-identified patent and that said Letters Patent are hereby corrected as shown below:

Claims 1 and 3, the subscript ---n--- should be inserted immediately following the bracket in the structural formula.

Signed and sealed this 19th day of February 1974.

(SEAL)
Attest:

EDWARD M. FLETCHER, JR.
Attesting Officer

C. MARSHALL DANN
Commissioner of Patents